United States Patent [19]

Higuchi

[11] Patent Number: 5,161,386
[45] Date of Patent: Nov. 10, 1992

[54] MULTI-SYSTEM AIR-CONDITIONING MACHINE HAVING A PLURALITY OF INDOOR UNITS CONNECTED TO A SINGLE OUTDOOR UNIT

[75] Inventor: Itsuo Higuchi, Fuji, Japan

[73] Assignee: Kabushiki Kaisha Toshiba, Kawasaki, Japan

[21] Appl. No.: 738,513

[22] Filed: Jul. 31, 1991

[30] Foreign Application Priority Data

Jul. 31, 1990 [JP] Japan ................... 2-203562
Nov. 30, 1990 [JP] Japan ................... 2-340338

[51] Int. Cl.⁵ .............................................. F25B 13/00
[52] U.S. Cl. ........................... 62/160; 62/238.7; 62/509
[58] Field of Search ............ 62/160, 238.6, 238.7, 62/509; 237/2 B

[56] References Cited

U.S. PATENT DOCUMENTS

| | | | |
|---|---|---|---|
| 3,769,808 | 11/1973 | Kramer | 62/509 X |
| 4,242,881 | 1/1981 | Williams | 62/399 X |
| 4,256,475 | 3/1981 | Schafer | 237/2 B |
| 4,667,479 | 5/1987 | Doctor | 62/238.7 |
| 5,046,323 | 9/1991 | Kuwahara | 62/160 X |

FOREIGN PATENT DOCUMENTS

| | | |
|---|---|---|
| 0072543 | 2/1983 | European Pat. Off. . |
| 54-685 | 1/1979 | Japan . |
| 64-6657 | 1/1989 | Japan . |
| 991339 | 5/1965 | United Kingdom . |
| 2198828 | 6/1988 | United Kingdom . |

Primary Examiner—William E. Wayner
Attorney, Agent, or Firm—Cushman, Darby & Cushman

[57] ABSTRACT

A heat-pump refrigeration cycle is constructed using a compressor, a four-way valve, a water heat exchanger, a receiver, and air heat exchangers. The compressor draws in, compresses, and discharges refrigerant. The four-way valve switches a direction of refrigerant flow, and a water heat exchanger allows an exchange of heat between inflow refrigerant and water supplied from a water supply unit. The receiver stores liquefied refrigerant, and a parallel circuit of a plurality of air heat exchangers allows an exchange of heat between the inflow refrigerant and indoor air. The water heat exchangers are positioned at a location higher than the receiver, which, during the cooling operation, permits liquefied refrigerant generated at the water heat exchanger to run down into the receiver. This prevents the refrigerant from remaining in the water heat exchangers.

10 Claims, 9 Drawing Sheets

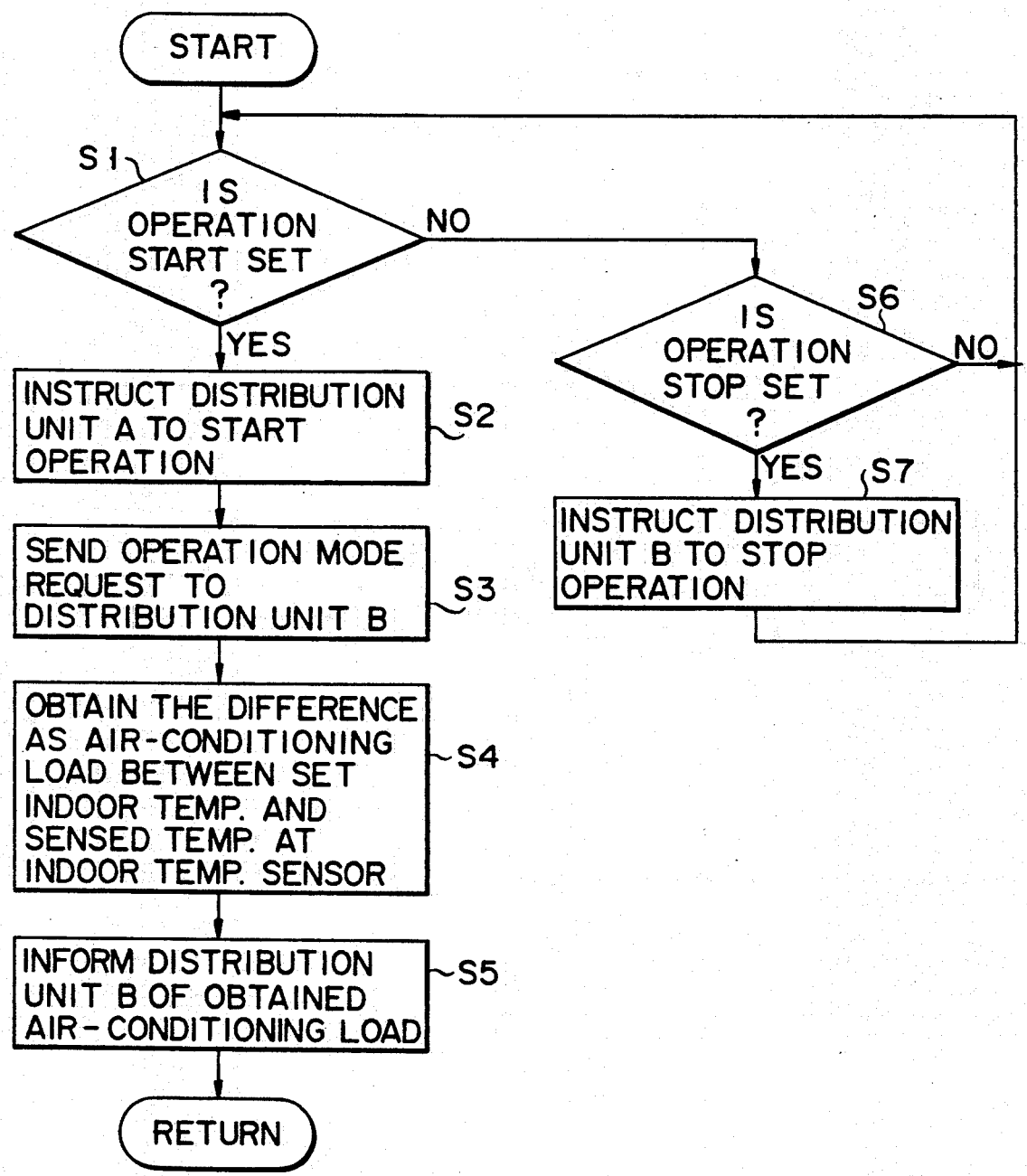
F I G. 5

MULTI-SYSTEM AIR-CONDITIONING MACHINE HAVING A PLURALITY OF INDOOR UNITS CONNECTED TO A SINGLE OUTDOOR UNIT

BACKGROUND OF THE INVENTION

1. Field of the Invention

This invention relates to a multi-system air conditioning machine capable of air-conditioning a plurality of rooms.

2. Description of the Related Art

In multi-system air-conditioning machines, a plurality of indoor units are connected to a single outdoor unit.

In some of such air-conditioning machines, the outdoor unit contains a compressor, a water heat exchanger, and a receiver, and the indoor units each contain air heat exchangers.

The compressor, water heat exchanger, receiver, and a parallel circuit of air heat exchangers are connected to one another by means of piping so as to constitute a refrigeration cycle. With this configuration, use of the water heat exchanger increases the air-conditioning capability.

The water heat exchanger provides a heat exchange between the inflow refrigerant and the water supplied from an external water supply unit. The refrigerant gas discharged from the compressor is converted into a liquefied refrigerant at the water heat exchanger.

The receiver stores an excess of liquefied refrigerant generated due to variations in the air-conditioning load.

In conventional air-conditioning machines, however, it is difficult to store all of the surplus liquefied refrigerant in the receiver. For example, part of the liquefied refrigerant can always remain in the water heat exchanger. If this happens, the heat exchanging area of the water heat exchanger decreases, reducing the air-conditioning capability.

One multi-system air-conditioning machine is disclosed in Published Unexamined Japanese Patent Application No. 64-6657.

The reference numerals used in the discussion below refer to FIGS. 1 and 3 of published unexamined Japanese Patent Application No. 64-b 6657.

In the disclosed machine in which the outdoor unit is provided with a plurality of air heat exchangers 3 and 4 and indoor units are provided with air heat exchangers 11a and 11b, the inflow of refrigerant into the air heat exchangers 3 and 4 is controlled according to the number of indoor units operated.

Here, the outdoor unit of the air-conditioning machine is not provided with a water heat exchanger.

Another multi-system air-conditioning machine is disclosed in Published Examined Japanese Utility Model Application No. 54-685.

The reference numerals used in the discussion below refer to FIG. 1 of published unexamined Japanese Patent Application No. 54-685.

In this machine, the outdoor unit A is provided with a water heat exchanger 3. However, the application has no explanation in it for the possibility that the liquefied refrigerant might remain in the water heat exchanger 3 and a the way of removing the remaining refrigerant.

SUMMARY OF THE INVENTION

The object of the present invention is to prevent a liquefied refrigerant from always remaining in the water heat exchanger to maximize the heat exchanging area of the water heat exchanger, thereby improving the air-conditioning capability.

The foregoing object is accomplished by a multi-system air-conditioning machine having a plurality of indoor units connected to a single outdoor unit, which comprises: a compressor installed in the outdoor unit, which sucks in a refrigerant, compresses it, and discharges it; a receiver installed in the outdoor unit, which stores a liquefied refrigerant; a water supply unit; a water heat exchanger that allows an exchange of heat between the inflow refrigerant and the water supplied from the water supply unit, with the water heat exchanger positioned at a location higher than the receiver in said outdoor unit; a plurality of air heat exchangers installed in the indoor units, which allow an exchange of heat between the inflow refrigerant and the indoor air; and a refrigeration cycle in which the compressor, the water heat exchanger, the receiver, and the air heat exchangers are connected to each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a flowchart for explaining the operation of the indoor control section in the embodiment;

DETAILED DESCRIPTION OF THE PREFERRED EMBODIMENTS

Referring to the accompanying drawings, an embodiment of the present invention will be explained hereinafter.

Figure 1:
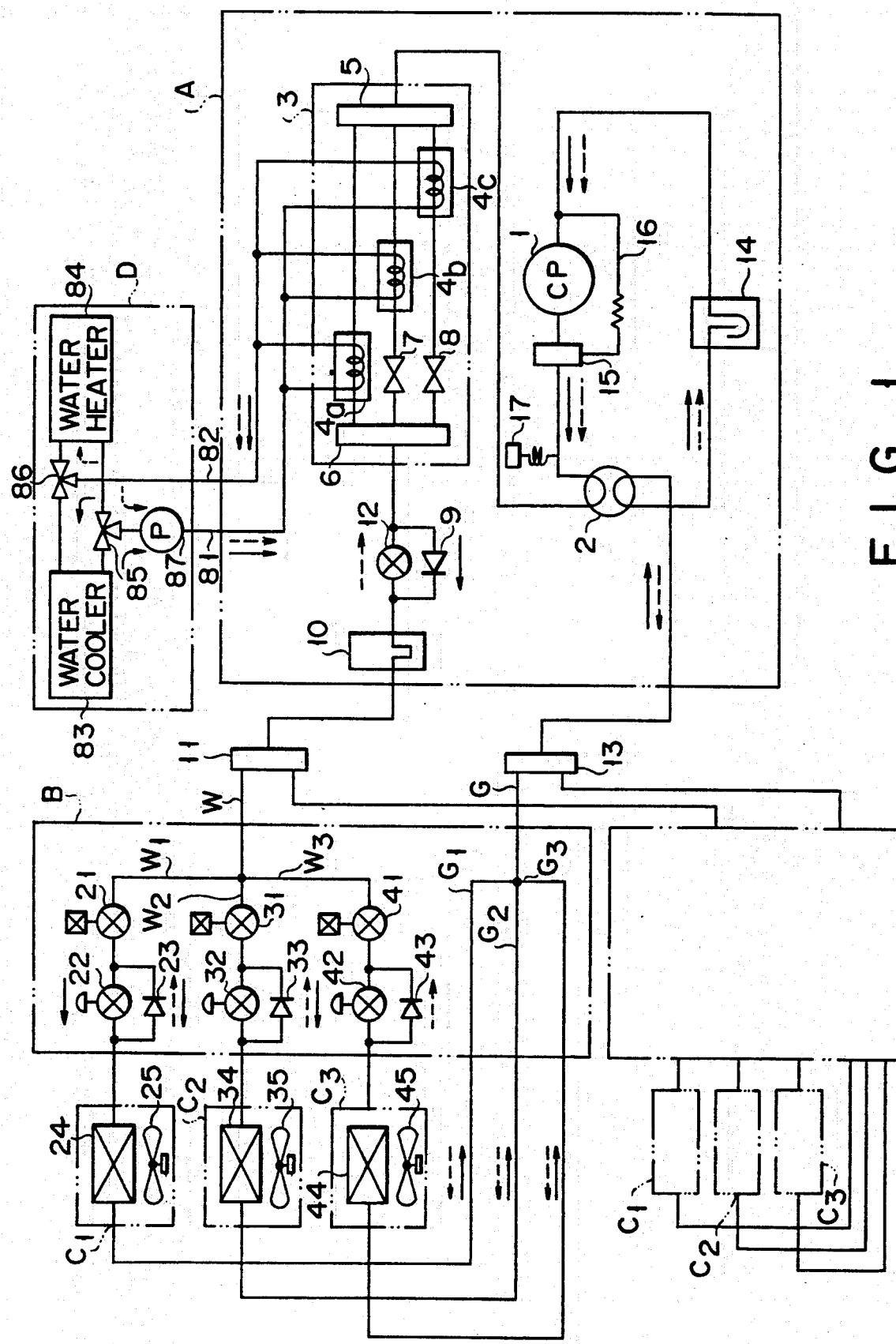
FIG. 1 is a schematic diagram showing the construction of a refrigeration cycle according to an embodiment of the present invention.

As shown in FIG. 1, a distribution unit B is connected to an outdoor unit A by means of piping. A plurality of indoor units $C_1$, $C_2$, and $C_3$ are connected to the distribution unit B via piping.

These units A, B, $C_1$, $C_2$, and $C_3$ constitutes a heat-pump refrigeration cycle that will be described below.

The outdoor unit A is provided with a variable-capability compressor 1, which sucks in a refrigerant at the intake, compresses it, and discharges it at the outlet.

A water heat exchanger unit 3 is connected to the outlet of the compressor 1 via a magnetic four-way valve 2. The four-way valve 2, which changes the direction of refrigerant flow, is set in the neutral position when de-energized and performs switching operation when energized.

The water heat exchanger unit 3 is composed of a parallel connection of a plurality of water heat exchangers 4a, 4b, and 4c via headers 5 and 6, and magnetic two-way valves 7 and 8 installed in the pipes on the side where a check valve 9 and an expansion valve 12 are located which will be explained later.

Water heat exchangers 4a, 4b, and 4c exchanges heat between the inflow refrigerant and the cold or hot water supplied from the water supply unit D to be explained later.

Figure 2:
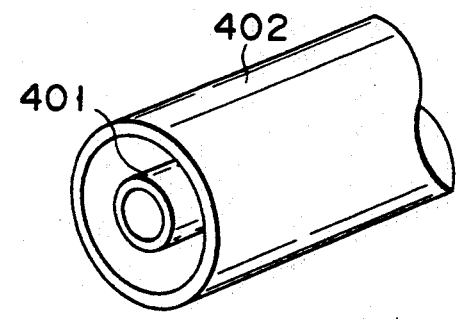
FIG. 2 is a perspective view showing the construction of the inner tube and outer tube of the water heat exchanger in the embodiment.

As shown in FIG. 2, the water heat exchangers 4a, 4b, and 4c are of the double tube type in which an inner tube 401 and an outer tube ar arranged coaxially. Water flows through the inner tube 401 and a refrigerant passes between the inner and outer tubes. The double tube type provides an efficient heat exchange between water and refrigerant.

The water heat exchanger unit 3 is connected to a receiver 10 via the check valve 9 in the forward direction. The receiver 10 is connected to a header 11.

The expansion valve 12 is connected between the receiver and water heat exchanger unit 3.

The header 11 is connected to a liquid-side pipe W, which branches out into three liquid-side pipes $W_1$, $W_2$, and $W_3$.

The liquid-side pipes $W_1$, $W_2$, and $W_3$ are connected, via flow control valves 21, 31, and 41, and expansion valves 22, 32, and 42, to the air heat exchangers 24, 34, and 44 of indoor units $C_1$, $C_2$, and $C_3$, respectively.

Pulse motor valves, whose valve position varies with the number of driving pulses, are used for the flow control valves 21, 31, and 41. Flow control valves are referred to as PMVs, hereinafter.

Air heat exchangers 24, 34, and 44 exchange heat between the inflow refrigerant and the indoor air.

Check valves 23, 33, and 43 are connected in the forward direction between the air heat exchangers 24, 34, and 44 and flow control valves 21, 31, and 41.

Gas-side pipes $G_1$, $G_2$, and $G_3$ are connected to the air heat exchangers 24, 34, and 44.

The gas-side pipes $G_1$, $G_2$, and $G_3$ are connected to a gas-side pipe G.

The gas-side pipe G is connected to a header 13, which is in turn connected to the intake of the compressor 1 via the four-way valve 2 and an accumulator 14.

An oil separator 15 is installed to the outlet of the compressor 1. A bypass 16 is connected across the compressor 1, running from the oil separator 15 to the intake of the compressor 1.

Installed between the compressor 1 and four-way valve 2 is a pressure sensor 17, which senses high-pressure-side pressures.

A water-supply unit D is connected to the outdoor unit A via water pipes 81 and 82.

The water-supply unit D contains a water cooler 83 for producing cold water, a water heater 84 for producing hot water, magnetic three-way valves 85 and 86, and a pump 87. Each of the three-way valves 85 and 86 has two water courses, with one water course being open and the other closed when in the neutral position or de-energized, and one water course being closed and the other open when energized.

For the water cooler 83, a cooling tower is used, for example. The water heater 84 may be of the heater type making use of late-night electric power.

The outlet of the water cooler 83 is connected to the intake of a pump 87 via one water course of the three-way valve 85.

The outlet of the water heater 84 is connected to the intake of the pump 87 via the other water course of the three-way valve 85.

The outlet of the pump 87 is connected to the water pipe 81.

The water pipe 81 is connected to one end of each of the inner tubes 401 of the water heat exchangers 4a, 4b, and 4c.

The other end of each of the inner tubes 401 is connected to the water pipe 82.

The water pipe 82 is connected to the intake of the water cooler 83 via one water course of the three-way valve 86. The water pipe 82 is connected to the intake of the water heater 84 via the other water course of the three-way valve 86.

Figure 3:
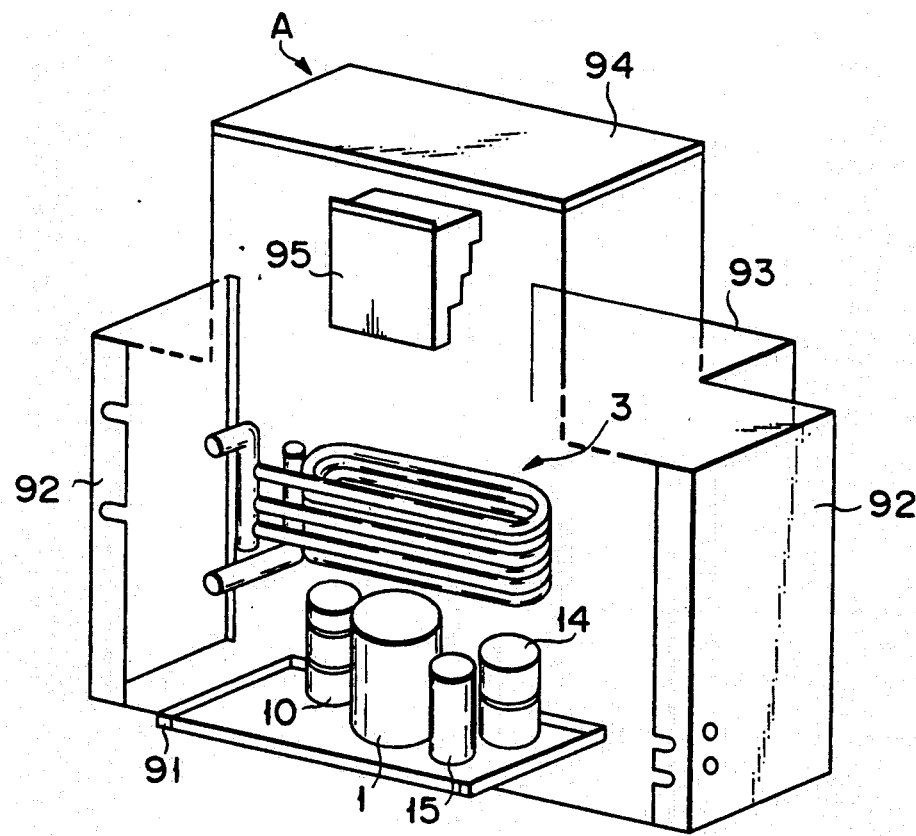
FIG. 3 is an exploded view showing the construction of the outdoor unit in perspective in the embodiment.

FIG. 3 illustrate the location of parts on the outdoor unit A.

Around a base plate 91, there are side plates 92, 92, back plate 93, and ceiling plate 94 installed. Numeral 95 indicates an electrical parts box.

On the base plate 91, the compressor 1, receiver 10, accumulator 14, and oil separator 15 are installed.

The water heat exchanger unit 3 is installed at a location higher than the compressor 1, receiver 10, accumulator 14, and oil separator 15.

Figure 4:
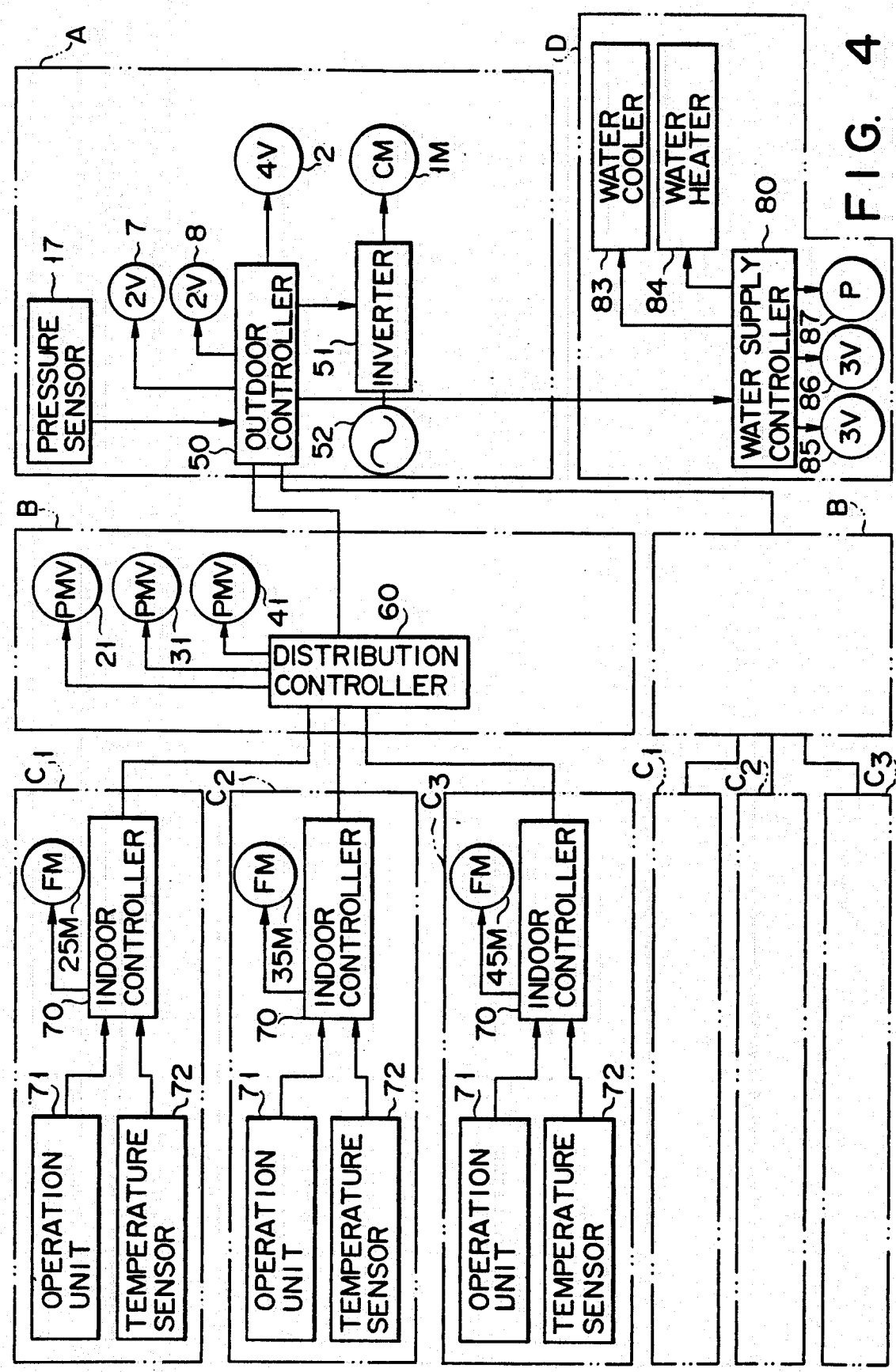
FIG. 4 is a block diagram for the control circuit in the embodiment.

FIG. 4 is a block diagram for the control circuit.

The outdoor unit A contains an outdoor controller 50, which is composed of a microcomputer and related peripheral circuitry.

The outdoor controller 50 is connected to the four-way valve 2, two-way valves 7 and 8, pressure sensor 17, and inverter 51.

The inverter 51 rectifies the voltage of a commercial alternating-current power supply 52, converts it into a voltage of a specified frequency as required by the outdoor controller 50, and then supplied it. The output of the inverter 51 is supplied to a compressor motor 1M as driving power. The compressor motor 1M is a driving motor for the compressor 1.

The outdoor controller 50 is connected via signal lines to a distribution controller 60 of the distribution unit B. The distribution controller 60 is composed of a microcomputer and related peripheral circuitry.

The distribution controller 60 is connected to PMVs 11, 21, and 31.

The distribution controller 60 is connected to the indoor controllers 70, 70, 70 of the indoor units $C_1$, $C_2$, and $C_3$ via signal lines. Each of these indoor controllers 70, 70, 70 is composed of a microcomputer and related peripheral circuitry.

Each of the indoor controllers 70, 70, 70 is connected to an operation unit 71 and temperature sensor 72.

The temperature sensor 72 senses indoor temperatures.

The outdoor controller 50 is connected to the water supply controller 80 of the water supply unit D via signal lines. The water supply controller 80 is composed of a microcomputer and related peripheral circuitry.

The water supply controller 80 is connected to the water cooler 83, water heater 84, three-way valves 85 and 86, and pump 87.

The indoor controllers 70, 70, 70 of the indoor units $C_1$, $C_2$, and $C_3$ have the following functional means [1], [2], [3], and [4]:

Means [1] for instructing the distribution unit B to start and stop operation by means of the operation unit 71.

Means [2] for sending to the distribution unit B a request for the cooling operation mode or heating operation mode set at the operation unit 71.

Means [3] for calculating the difference as air-conditioning load between the indoor temperature set at the operation unit 71 and the temperature sensed at the temperature sensor 72.

Means [4] for informing the distribution unit B of the calculated air-conditioning load.

The distribution controller 60 has the following functional means [1] through [9]:

Means [1] for determining on one of the cooling or heating operation modes according to the request of the indoor units $C_1$, $C_2$, and $C_3$.

Means [2] for informing the outdoor controller 50 of the determined operation mode.

Means [3] for fully closing the PMVs connected to the indoor units requesting the heating operation mode, among the PMVs 21, 31, and 41, when the cooling operation mode is determined.

Means [4] for controlling the opening degree of each of the PMVs connected to the indoor units requesting the cooling operation mode, among the PMVs 21, 31, and 41, depending on the air-conditioning load for each indoor unit, when the cooling operation mode is determined.

Means [5] for calculating the total of air-conditioning loads for the indoor units requesting the cooling operation mode when the cooling operation mode is determined.

Means [6] for fully closing the PMVs connected to the indoor units requesting the cooling operation mode, among the PMVs 21, 31, and 41, when the heating operation mode is determined.

Means [7] for controlling the opening degree of each of the PMVs connected to the indoor units requesting the heating operation mode, among the PMVs 21, 31, and 41, depending on the air-conditioning load for each indoor unit, when the heating operation mode is determined.

Means [8] for calculating the total of air-conditioning loads for the indoor units requesting the heating operation mode when the heating operation mode is determined.

Means [9] for informing the outdoor unit A of the calculated total of air-conditioning loads.

The outdoor controller 50 has the following functional means [1] through [9].

Means [1] for starting to operate the compressor 1 by driving the inverter 51 in response to the operation start instruction.

Means [2] for controlling the frequency F (Hz) of the output of the inverter 51 according to the total of signal air-conditioning loads.

Means [3] for setting the four-way valve 2 in the neutral position without energizing it when the cooling operation mode is requested.

Means [4] for operating the water cooler 83 of the water supply unit D, setting the three-way valves 85 and 86 in the neutral position, and operating the pump 87 when the cooling operation mode is requested.

Means [5] for switching the four-way valve 2 by energizing it when the heating operation mode is requested.

Means [6] for operating the water heater 84 of the water supply unit D, switching the three-way valves 85 and 86, and operating the pump 87 when the heating operation mode is requested.

Means [7] for controlling the opening/closing of the two-way valves 7 and 8 of the water heat exchanger unit 3 depending on the sensed pressure at the pressure sensor 17 during the cooling or heating operation.

Means [8] for stopping the operation of the compressor 1 by stopping the drive of the inverter 51 in response to the operation stop instruction.

Means [9] for stopping the operation of the water supply unit D in response to the operation stop instruction.

The operation of the indoor units $C_1$, $C_2$, and $C_3$ will be explained, referring to FIG. 5.

When the operation unit 71 is set to the operation start (step S1), the distribution unit B is instructed to start operation (step S2).

At the same time, either the cooling operation mode or the heating operation mode set at the operation unit 71 is sent to the distribution unit B (step S3).

The difference between the indoor temperature set at the operation unit 71 and the sensed temperature at the temperature sensor 72 is calculated as air-conditioning load (step S4). The distribution unit B is informed of the calculated air-conditioning load (step S5).

When the operation unit is set to the operation stop (step S6), the distribution unit B is instructed to stop operation (step S7).

Figure 6:
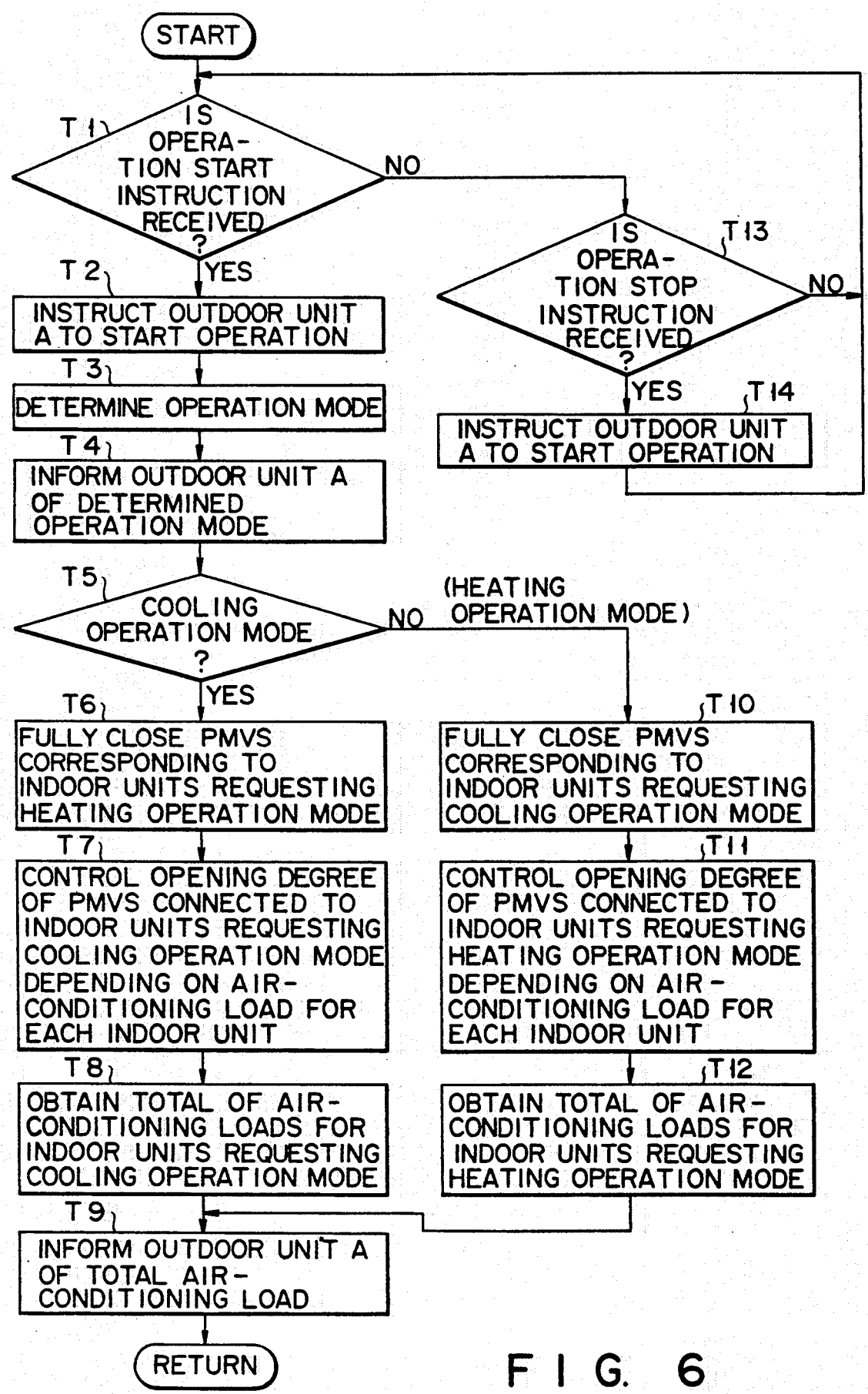
FIG. 6 is a flowchart for explaining the operation of the distribution control section in the embodiment.

Referring to FIG. 6, the operation of the distribution unit will now be described.

When at least one of the indoor units $C_1$, $C_2$, and $C_3$ sends the operation start instruction (step T1), the outdoor unit A is instructed to start operation (step T2). At the same time, either the cooling operation mode or the heating operation mode is determined depending on the request of the indoor units $C_1$, $C_2$, and $C_3$ (step T3).

For example, the number of requests for the cooling operation mode is compared with the number of request for the heating operation mode to determine on the mode for which the number of requests is larger.

Another way is to previously give the order of priority to the indoor units $C_1$, $C_2$, and $C_3$, and select and determine on the operation mode of the indoor unit whose priority is higher than those of any other indoor units requesting operation.

The outdoor controller 50 is informed of the determined operation mode (step T4).

When the cooling operation mode is determined (step T5), the PMVs connected to the indoor units requesting the heating operation mode among the PMVs 21, 31, and 41 are fully closed (step T6).

At the same time, the opening degree of each of the PMVs connected to the indoor units requesting the cooling operation mode among the PMVs 21, 31, and 41 is controlled according to the air-conditioning load for each indoor unit (step T7).

Then, the total of air-conditioning loads for the indoor units requesting the cooling operation mode is calculated (step T8). The outdoor unit A is informed of the calculated total of air-conditioning loads (step T9).

When the heating operation mode is determined (step T5), the PMVs connected to the indoor units requesting the cooling operation mode among the PMVs 21, 31, and 41 are fully closed (step T10).

At the same time, the opening degree of each of the PMVs connected to the indoor units requesting the heating operation mode among the PMVs 21, 31, and 41 is controlled according to the air-conditioning load for each indoor unit (step T11).

Then, the total of air-conditioning loads for the indoor units requesting the heating operation mode is calculated (step T12). The outdoor unit A is informed of the calculated total of air-conditioning loads (step T9).

When all of the indoor units $C_1$, $C_2$, and $C_3$ request an operation stop (step T13), the outdoor unit A is informed of the operation stop instruction (step T14).

Figure 7:
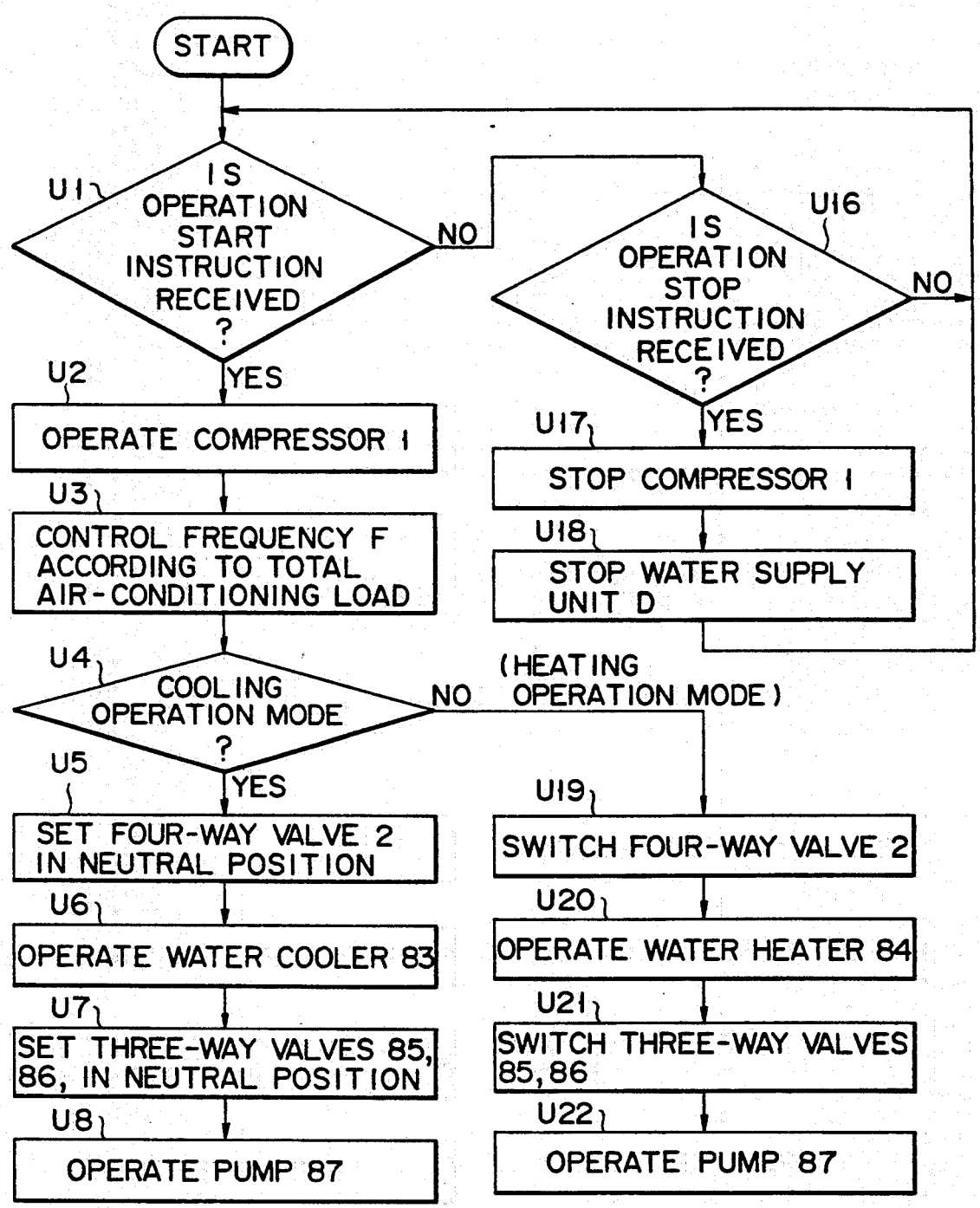
FIGS. 7, 8, and 9 are flowcharts for explaining the operation of the outdoor control section in the embodiment.
Figure 8:
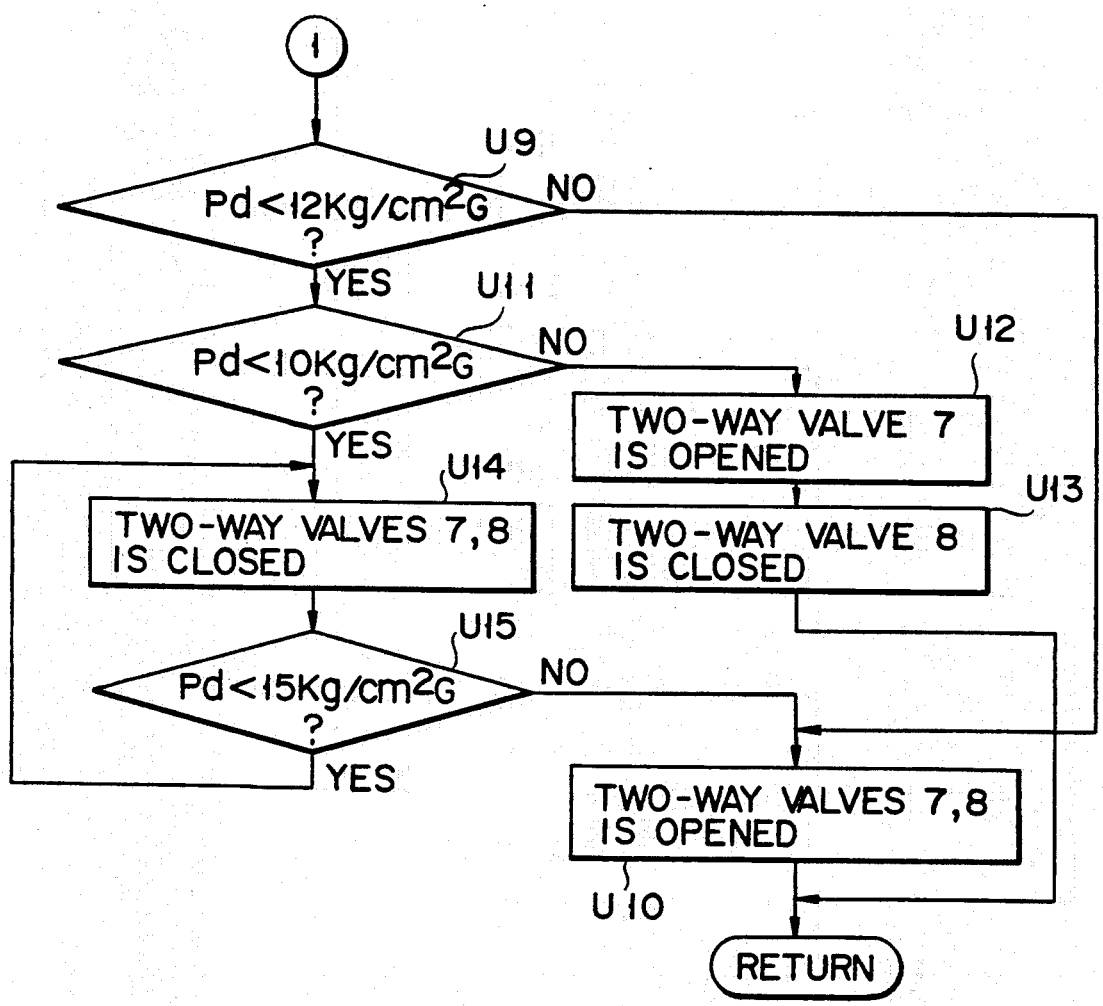
Figure 9:
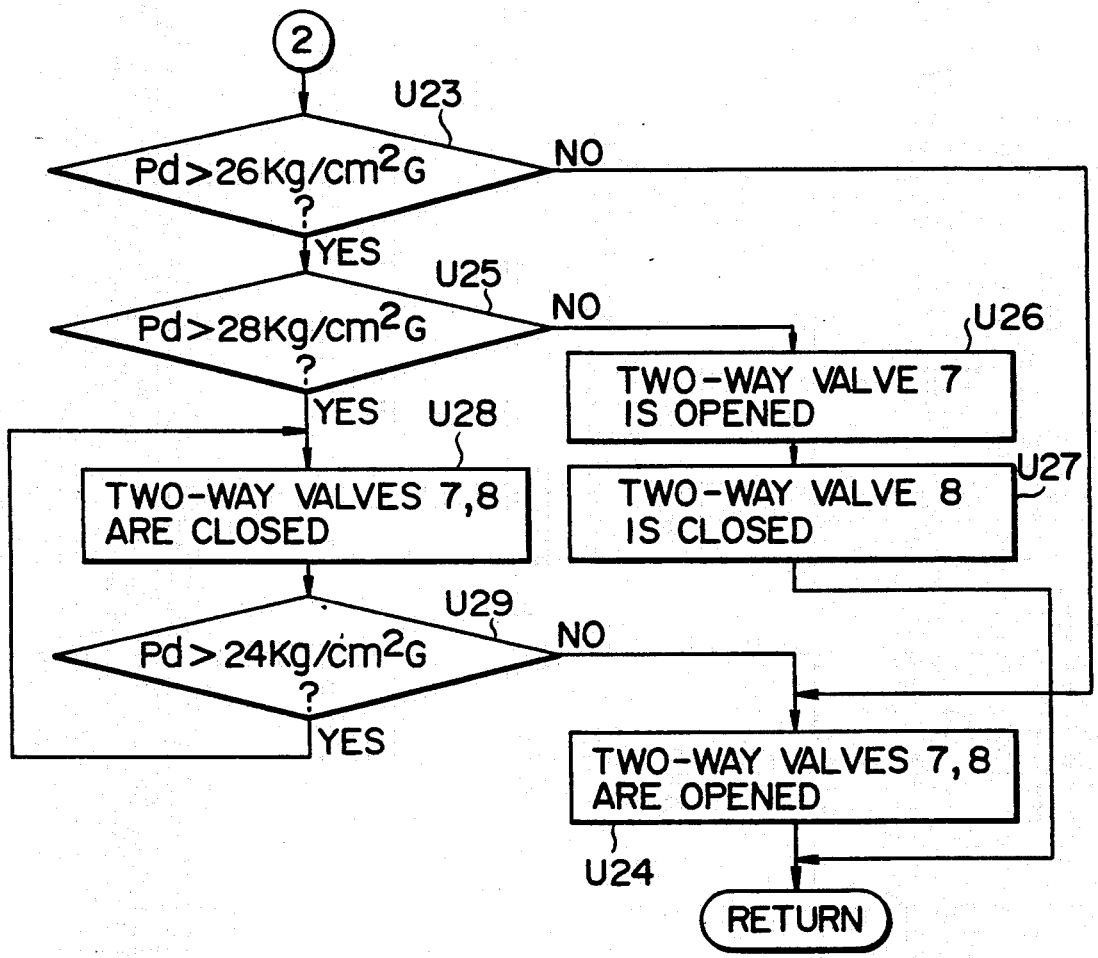

Referring to FIGS. 7, 8, and 9, the operation of the outdoor unit A and water supply unit D will be explained.

When the distribution unit B requests an operation start (step U1), the inverter 51 is driven and the compressor 1 starts to operate (step U2).

The frequency F (Hz) of the output of the inverter 51 is controlled according to the total of air-conditioning loads (step U3).

If the cooling operation mode is requested (step U4), the four-way valve 2 is set in the neutral position (step U5).

At the same time, the water cooler 83 of the water supply unit D is operated (step U6), the three-way valves 85 and 86 are set in the neutral position (step U7), and the pump 87 is driven (step U8).

When the pump 87 starts to run, the cooling water in the water cooler 83 flows through one water course of the three-way valve 85 into the water pipe 81. The cooling water flowing into the water pipe 81 enters the water heat exchangers 4a, 4b, and 4c. The water leaving the water heat exchangers 4a, 4b, and 4c flows through the water pipe 82 and then through one water course of the three-way valve 86 into the water cooler 83.

In this case, as illustrated by solid-line arrows in FIG. 1, the compressor 1 discharges the refrigerant gas, which passes through the four-way valve 2 and enters the water heat exchanger unit 3. The refrigerant gas flowing into the water heat exchanger unit 3 enters the water heat exchangers 4a, 4b, and 4c, which allow the cooling water from the water supply unit D to deprive the refrigerant gas of heat to liquefy it.

The liquefied refrigerant leaving the water heat exchanger unit 3 flows through the check valve 9, receiver 10, and header 11, and then into the liquid-side pipe W. The liquefied refrigerant flowing into the liquid-side pipe W passes through open ones of the PMVs 21, 31, and 41. It is assumed hereinafter that the PMVs 21 and 31 are open and the PMV 41 is closed.

The liquefied refrigerant passing through the PMVs 21 and 31 is reduced in pressure in the expansion valves 22 and 32, and enters the air heat exchangers 24 and 34.

Since the water heat exchanger unit 3 is positioned higher than the receiver 10, the liquefied refrigerant generated at the water heat exchangers 4a, 4b, and 4c all runs down into the receiver 10 without remaining in the water heat exchangers 4a, 4b, and 4c.

The refrigerant entering the air heat exchangers 24 and 34 deprives the indoor air of heat to vaporize. The refrigerant gas leaving the air heat exchangers 24 and 34 enters the gas-side pipe G and then passes through the header 13, four-way valve 2, and accumulator 14 and goes into the compressor 1.

That is, the water heat exchanger unit 3 acts as condenser and the indoor heat exchangers 24 and 34 serve as evaporator to perform the cooling operation of the indoor units $C_1$ and $C_2$.

During the cooling operation, the pressure sensor 17 senses a high-pressure-side pressure Pd, which is then compared with a set value of 12 $Kg/cm^2G$ (step U9).

If the number of indoor units operated among $C_1$, $C_2$, and $C_3$ is two or more, the high-pressure-side pressure Pd is higher than the set value 12 $Kg/cm^2G$ (Pd > 12 $Kg/cm^2G$). In this condition, both of the two-way valves 7 and 8 are opened (step U10).

When the two-way valves 7 and 8 are open, the refrigerant passes through all of the water heat exchangers 4a, 4b, and 4c, which maximizes the condensing capacity of the water heat exchanger unit 3.

When the operation is switched to an independent operation of one of the indoor units $C_1$, $C_2$, and $C_3$, the condensing capacity of the water heat exchanger unit 3 becomes excessive, causing the high-pressure-side pressure Pd to drop.

When the high-pressure-side pressure Pd drops below the set value 12 $Kg/cm^2G$ (Pd < 12 $Kg/cm^2G$), the high-pressure-side pressure Pd is then compared with another set value of 10 $Kg/cm^2G$ (step U11).

If the high-pressure-side pressure Pd is larger than the set value 10 $Kg/cm^2G$ (12 $Kg/cm^2G$ > Pd > 10 $Kg/cm^2G$), the two-way valve 7 remains open (step U12) and the two-way valve 8 is closed (step U13).

When the two-way valve 7 is open and the two-way valve 8 is closed, the refrigerant passes through the two water heat exchangers 4a and 4b but not through the water heat exchanger 4c. This makes the condensing capacity of the water heat exchanger unit 3 moderate.

When the high-pressure-side pressure Pd decreases further below the set value 10 $Kg/cm^2G$ (Pd < 10 $Kg/cm^2G$), the two-way valves 7 and 8 are both closed (step U14).

When the two-way valves 7 and 8 are closed, the refrigerant passes through one water heat exchanger 4a but not through the water heat exchangers 4b and 4c, which minimizes the condensing capacity of the water heat exchanger unit 3.

Under this condition, the high-pressure-side pressure Pd is compared with still another set value of 15 $Kg/cm^2G$ (step U15).

If the high-pressure-side pressure Pd is lower than the set value 15 $Kg/cm^2G$ (Pd < 15 $Kg/cm^2G$), the two-way valves 7 and 8 remain closed (step U14).

The number of indoor units operated among $C_1$, $C_2$, and $C_3$ is increased, the condensing capacity of the water heat exchanger unit 3 becomes insufficient, raising the high-pressure-side pressure Pd.

If the high-pressure-side pressure Pd exceeds the set value 15 $Kg/cm^2G$ (Pd > 15 $Kg/cm^2G$), the two-way valves 7 and 8 are both opened (step U10).

In this way, the water heat exchangers 4a, 4b, and 4c operate selectively, which suppresses an excessive rise in the condensing capacity, thereby maintaining the high-pressure-side pressure Pd at the necessary and sufficient value without dropping excessively.

Figure 10:
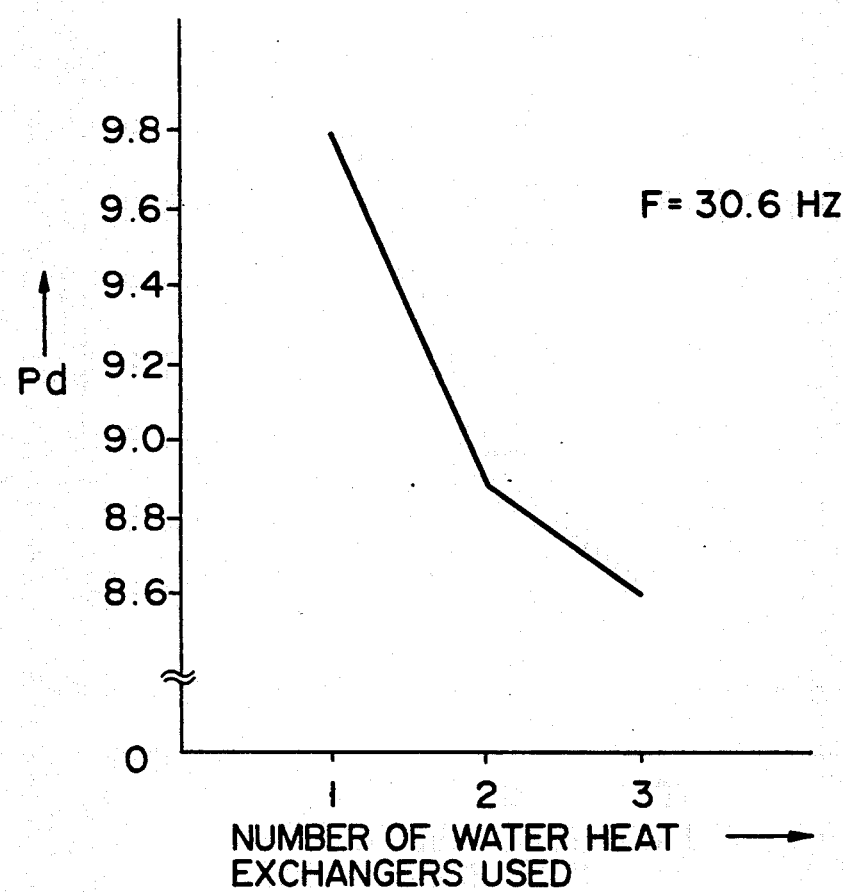
FIG. 10 is a graph illustrating the relationship between the high-pressure-side pressure and the number of water heat exchangers used in the embodiment.

FIG. 10 shows the relationship between the high-pressure-side pressure Pd and the number of water heat exchangers used among 4a, 4b, and 4c.

In this example, to maintain the high-pressure-side pressure Pd higher than 9 Kg/cm$^2$G, what are used as set values for the high-pressure-side pressure Pd are different from the above 10 Kg/cm$^2$G, 12 Kg/cm$^2$G, and 15 Kg/cm$^2$G.

If the temperature of the cooling water in the supply water unit D drops too far, low-load operation takes place, which tends to cause the high-pressure-side Pd to drop significantly. In this case, the water heat exchangers 4a, 4b, and 4c also operate selectively, which prevents the high-pressure-side pressure Pd from decreasing excessively, thereby maintaining it at the necessary and sufficient value.

Since the water heat exchanger unit 3 is positioned higher than the receiver 10, the liquefied refrigerant generated at the water heat exchangers 4a, 4b, and 4c almost all runs down into the receiver 10, which prevents the liquefied refrigerant from always remaining in the water heat exchangers 4a, 4b, and 4c.

Therefore, it is possible to use the heat exchanging area of the water heat exchangers 4a, 4b, and 4c to a maximum, thereby improving the air-conditioning capability.

Since the two-way valves are installed in the pipes on the side where the check valve 9 and expansion valve 12 are located (on the side where the air heat exchangers 24, 34, and 44 are located) among the pipes connected to the water heat exchangers 4b and 4c, when the number of indoor units operated among $C_1$, $C_2$, and $C_3$ is decreased and at least one of the two-way valves 7 and 8 is closed, excess refrigerant is confined in the water heat exchanger whose refrigerant flow has been stopped.

Therefore, this, combined with the use of the receiver 10, always maintains the circulating amount of the refrigerant in the refrigeration cycle at an optimum condition.

When the distribution unit B requests an operation stop (step U16), the drive of the inverter 51 is stopped and the operation of the compressor 1 is stopped (step U17). At the same time, the operation of the water supply unit D is stopped (step U18).

If the heating operation mode is requested (step U4), the four-way valve 2 is switched (step U19).

At the same time, the water heater 84 of the water supply unit D is operated (step U20), the three-way valves 85 and 86 are switched (step U21), and the pump 87 is driven (step U22).

When the pump 87 starts to run, the hot water in the water heater 84 flows through the other water course of the three-way valve 85 into the water pipe 81. The heating water flowing into the water pipe 81 enters the water heat exchangers 4a, 4b, and 4c. The water leaving the water heat exchangers 4a, 4b, and 4c passes through the water pipe 82 and then through the other water course of the three-way valve 86, and returns to the water heater 84.

In this case, as indicated by broken-line arrows in FIG. 1, the compressor 1 discharges the refrigerant gas, which flows through the four-way valve 2 and header 13 into the gas-side pipe G. In the explanation hereinafter, it is assumed that the PMVs 21 and 31 are open, and the PMV 41 is fully closed.

The refrigerant gas in the gas-side pipe G enters the air heat exchangers 24 and 34, which allow the indoor air to deprive the refrigerant gas of heat to liquefy it.

The liquefied refrigerant leaving the air heat exchangers 24 and 34 passes through the check valves 23 and 33, and the PMVs 21 and 31 and then enters the liquid-side pipe W. The liquefied refrigerant flowing into the liquid-side pipe W passe through the header 11, receiver 10, and expansion valve 12 and enters the water heat exchangers 4a, 4b, and 4c of the water heat exchanger unit 3.

The refrigerant entering the water heat exchangers 4a, 4b, and 4c deprives the hot water supplied from the water supply unit D of heat to vaporize. The refrigerant gas leaving the water heat exchangers 4a, 4b, and 4c passes through the four-way valve 2 and accumulator 14 and goes into the compressor 1.

That is, the indoor heat exchanger units 24 and 34 act as condenser and the water heat exchanger unit 3 functions as evaporator to perform the heating operation of the indoor units $C_1$ and $C_2$.

During the heating operation, the pressure sensor 17 senses an high-pressure-side pressure Pd, which is then compared with a set value of 26 Kg/cm$^2$G (step U23).

If the number of indoor units operated among $C_1$, $C_2$, and $C_3$ is two or more, the high-pressure-side pressure Pd is lower than the set value 26 Kg/cm$^2$G (Pd>26 Kg/cm$^2$G). Under this condition, the two-way valves 7 and 8 are both opened (step U24).

When the two-way valves 7 and 8 are open, the refrigerant passes through all of the water heat exchangers 4a, 4b, and 4c, which maximizes the evaporating capacity of the water heat exchanger unit 3.

When the operation is switched to an independent operation of one of the indoor units $C_1$, $C_2$, and $C_3$, the evaporating capacity of the water heat exchanger unit 3 becomes excessive, causing the high-pressure-side pressure Pd to rise.

When the high-pressure-side pressure Pd rises above the set value 26 Kg/cm$^2$G (Pd>26 Kg/cm$^2$G), the high-pressure-side pressure Pd is then compared with another set value of 28 Kg/cm$^2$G (step U25).

If the high-pressure-side pressure Pd is lower than the set value 28 Kg/cm$^2$G (28 Kg/cm$^{2G}$>Pd>26 Kg/cm$^2$G), the two-way valve 7 remains open (step U26) and the two-way valve 8 is closed (step U27).

When the two-way valve 7 is open and the two-way valve 8 is closed, the refrigerant passes through the two water heat exchangers 4a and 4b but not through the water heat exchanger 4c. This makes the evaporating capacity of the water heat exchanger unit 3 moderate.

When the high-pressure-side pressure Pd increases further above the set value 28 Kg/cm$^2$G (Pd>28 Kg/cm$^2$G), the two-way valves 7 and 8 are both closed (step U28).

When the two-way valves 7 and 8 are closed, the refrigerant passes through one water heat exchanger 4a but not through the water heat exchangers 4b and 4c, which minimizes the evaporating capacity of the water heat exchanger unit 3.

Under this condition, the high-pressure-side pressure Pd is compared with still another set value of 24 Kg/cm$^2$G (step U29).

If the high-pressure-side pressure Pd is higher than the set value 24 Kg/cm$^2$G (Pd>24 Kg/cm$^2$G), the two-way valves 7 and 8 remain closed (step U28).

The number of indoor units operated among $C_1$, $C_2$, and $C_3$ is increased, the evaporating capacity of the water heat exchanger unit 3 becomes insufficient, dropping the high-pressure-side pressure Pd.

If the high-pressure-side pressure Pd drops below the set value 24 Kg/cm$^2$G (Pd<24 Kg/cm$^2$G), the two-way valves 7 and 8 are both opened (step U24).

In this way, the water heat exchangers 4a, 4b, and 4c operate selectively, which suppresses an excessive rise in the evaporating pressure, thereby avoiding an extreme rise in the high-pressure-side pressure Pd.

When the temperature of the hot water in the supply water unit D rises too high, overload operation takes place, which tends to cause the high-pressure-side pressure Pd to rise excessively. In this situation, however, the water heat exchangers 4a, 4b, and 4c also operate selectively, which prevents an excessive rise in the high-pressure-side pressure Pd.

In addition, hot water always flows through all of the water heat exchangers 4a, 4b, and 4c, so that even if the outdoor temperature is low, there is no possibility that the water heat exchangers 4a, 4b, and 4c are frozen.

When the distribution unit B requests an operation stop (step U16), the drive of the inverter 51 is stopped, and the operation of the compressor 1 is stopped (step U17). At the same time, the operation of the water supply unit D is stopped (step U18).

Figure 11:
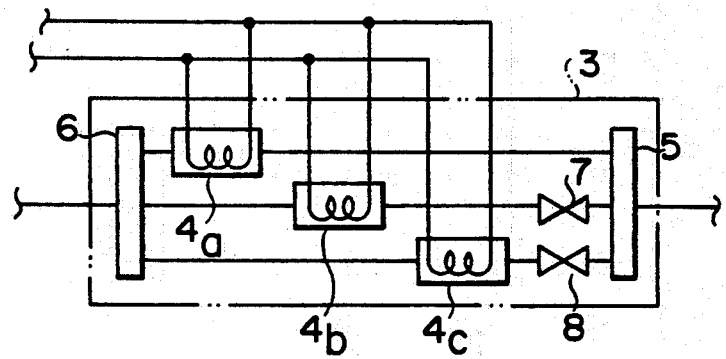
FIG. 11 shows an important portion of the refrigeration cycle according to another embodiment of the present invention.

The major portions of another embodiment according to the present invention are shown in FIG. 11.

In this embodiment, the two-way valves 7 and 8 are installed in the pipe on the side where the four-way valve 2 is located among the pipes connected to the water heat exchangers 4b and 4c. The remaining arrangement and the operation are the same as those with the above-mentioned embodiment.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A multi-system air-conditioning machine having a plurality of indoor units connected to a single outdoor unit, which comprises:
    a compressor installed in said outdoor unit, which draws in, compresses, and discharges refrigerant;
    a receiver installed in said outdoor unit, which stores liquefied refrigerant;
    a water supply unit;
    a plurality of water heat exchangers that allow an exchange of heat between an inflow of refrigerant and water supplied from said water supply unit, the water heat exchangers being positioned at a location higher than said receiver in said outdoor unit;
    a plurality of air heat exchangers installed in said indoor units, which allow an exchange of heat between the inflow refrigerant and indoor air;
    a refrigerant cycle in which said compressor, a parallel circuit of said water heat exchangers, said receiver, and a parallel circuit of said air heat exchangers are connected to each other by means of pipes;
    a plurality of two-way valves each installed in the pipes connected to said water heat exchangers in said refrigeration cycle;
    sensing means for sensing a high-pressure-side pressure in said refrigeration cycle; and
    control means for controlling an opening and a closing of said two-way valves according to said high-pressure-side pressure sensed.

2. A multi-system air-conditioning machine according to claim 1, wherein said two-way valves are installed on a side of said water heat exchangers where said air heat exchangers are located.

3. A multi-system air-conditioning machine according to claim 1, wherein said water heat exchangers are of a double tube type in which an inner tube and an outer tube are arranged coaxially, with water supplied by said water supply unit flowing through the inner tube and refrigerant flowing between the inner tube and outer tube.

4. A multi-system air-conditioning machine according to claim 1, wherein said water supply unit contains a water cooler producing cold water and a water heater producing hot water.

5. A multi-system air-conditioning machine having a plurality of indoor units connected to a single outdoor unit, which comprises:
    an inverter installed in said outdoor unit, which produces electric power of a specified frequency;
    a compressor motor installed in said outdoor unit, which operates on output from said inverter and varies a number of revolutions according to the specified frequency of the output of said inverter;
    a variable-capability compressor installed in said outdoor unit, which is driven by said compressor motor and draws in, compresses, and discharges refrigerant; p1 a receiver installed in said outdoor unit, which stores liquefied refrigerant;
    a water supply unit;
    a plurality of water heat exchangers that allow an exchange of heat between an inflow of refrigerant and water supplied from said water supply unit, the water heat exchangers being positioned at a location higher than said receiver in said outdoor unit;
    a plurality of air heat exchangers installed in said indoor units, which allow an exchange of heat between the inflow refrigerant and indoor air;
    a plurality of flow control valves for regulating an amount of the inflow refrigerant flowing through said air heat exchangers;
    a refrigeration cycle in which said compressor, a parallel circuit of said water heat exchangers, said receiver, said flow control valves, and said air heat exchangers are connected to each other by means of pipes;
    a plurality of two-way valves each installed in the pipes connected to said water heat exchangers in said refrigeration cycle;
    first sensing means installed in each of said indoor units, which sense an air-conditioning load based on a temperature of said indoor air;
    control means for controlling the specified frequency of the output of said inverter according to a total of said air-conditioning loads sensed;
    control means for controlling an opening degree of said flow control valves according to said air-conditioning loads sensed;
    second sensing means for sensing a high-pressure-side pressure in said refrigeration cycle; and
    control means for controlling an opening and a closing of said two-way valves according to said high-pressure-side pressure sensed.

6. A multi-system air-conditioning machine according to claim 5, wherein said two-way valves are installed on a side of said water heat exchangers where said air heat exchangers are located.

7. A multi-system air-conditioning machine according to claim 5, wherein said water heat exchangers are of a double tube type in which an inner tube and an outer tube are arranged coaxially, with water supplied by said water supply unit flowing through the inner tube and refrigerant flowing between the inner tube and outer tube.

8. A multi-system air-conditioning machine according to claim 5, wherein said water supply unit contains a water cooler producing cold water and a water heater producing hot water.

9. A multi-system air-conditioning machine according to claim 5, further comprising a distribution unit located between said outdoor unit and said indoor units.

10. A multi-system air-conditioning machine according to claim 9, wherein said flow control valves are installed in said distribution unit.

* * * * *